United States Patent [19]

Cooper et al.

[11] Patent Number: 5,729,673
[45] Date of Patent: Mar. 17, 1998

[54] DIRECT MANIPULATION OF TWO-DIMENSIONAL MOVING PICTURE STREAMS IN THREE-DIMENSIONAL SPACE

[75] Inventors: Brian C. Cooper, Sharon; Robert A. Gonsalves, Wellesley, both of Mass.; Daniel C. Robbins, Providence, R.I.

[73] Assignee: Avid Technology, Inc., Tewksbury, Mass.

[21] Appl. No.: 418,632

[22] Filed: Apr. 7, 1995

[51] Int. Cl.$^6$ .................................................. H04N 5/262
[52] U.S. Cl. ........................................... 395/127; 395/125
[58] Field of Search .................................. 395/127, 125, 395/119, 155, 326, 157, 340

[56] References Cited

U.S. PATENT DOCUMENTS

| 4,667,236 | 5/1987 | Dresdner | 358/160 |
| 5,121,210 | 6/1992 | Hiravama | 358/183 |

FOREIGN PATENT DOCUMENTS

| 0 283 159 A1 | 9/1988 | European Pat. Off. . |
| 0 387 981 A1 | 9/1990 | European Pat. Off. . |
| WO 94/03897 | 2/1994 | WIPO . |

OTHER PUBLICATIONS

Richard W. Bukowski and Carlo H. Séquin, "Object Associations: A Simple and Practical Approach to Virtual 3D Manipulation," Computer Graphics (Proceedings of the 1995 Symposium on Interactive 3D Graphics) ACM SIGGRAPH, pp. 131–138, 1995.

Stuart K. Card, Jock D. Mackinlay, and George G. Robertson, "The Design Space of Input Devices," CHI '90 Proceedings, pp. 117–124, Apr. 1990.

D. Brookshire Conner, Scott S. Snibbe, Kenneth P. Herndon, Daniel C. Robbins, Robert C. Zeleznik, and Andries van Dam, "Three–Dimensional Widgets," Computer Graphics (1992 Symposium on Interactive 3D Graphics), 25(2), ACM SIGGRAPH, pp. 183–188, Mar. 1992.

Michael Gleicher and Andrew Witkin, "Through–the–Lens Camera Control," Computer Graphics (Proceedings of SIGGRAPH '92), 26(2), pp. 331–340, Jul. 1992.

Kenneth P. Herndon and Tom Meyer, 3D Widgets for Exploratory Scientific Visualization, Proceedings of UIST '94, ACM SIGGRAPH, Nov., 1994, pp. 69–70.

Kenneth P. Herndon, Robert C. Zeleznik, Daniel C. Robbins, D. Brookshire Conner, Scott S. Snibbe and Andries van Dam, "Interactive Shadows," UIST '92, ACM SIGGRAPH, Monterey, California, pp. 1–6, Nov. 15–18, 1992.

Stephanie Houde, "Iterative Design of an Interface for Easy 3–D Direct Manipulation of Free–Form" Computer Graphics (SIGGRAPH '92 Proceedings of CHI '92), pp. 135–142, May 3–7, 1992.

William M Hsu, John F. Hughes and Henry Kaufman, "Direct Manipulation of Free–Form Deformations," Computer Graphics (SIGGRAPH '92 Proceedings), 26(2), pp. 177–184, Jul. 1992.

Jock D. Mackinlay, George G. Robertson, and Stuart K. Card, "The Perspective Wall; Detail and Context Smoothly Integrated," Proceedings of CHI '91, pp. 173–179, 1971).

(List continued on next page.)

*Primary Examiner*—Heather R. Herndon
*Assistant Examiner*—Sabrina Dickens
*Attorney, Agent, or Firm*—Mintz, Levin, Cohn, Ferris, Glovsky & Popeo, P.C.

[57] ABSTRACT

A video editing method that includes displaying a two-dimensional projection of a representation of a projection surface. This projection is derived from a three-dimensional position of the surface. A handle is displayed attached to the projection, and the position of the surface is updated in a manner corresponding to the displacement of a cursor at the handle. The method further includes displaying a second projection derived from the updated position, and redisplaying the handle attached to it.

50 Claims, 12 Drawing Sheets

OTHER PUBLICATIONS

Jock D. Mackinlay, George G. Robertson, and Stuart Card, "Rapid Controlled Movement Through Virtual 3D Workspaces," Proceedings of CHI '91, pp. 455–456, 1991 (article only).

George G. Robertson, Jack D. Mackinlay, and Stuart K. Card, "Cone Trees; Animated 3D Visualization of Hierarchical Information," Proceedings of CHI '91, pp. 189–194, 1991.

George G. Robertson, Jock D. Mackinlay, and Stuart K. Card, "Information Visualization Using 3D Interactive Animation", Proceedings of CHI '91 pp. 461–462, 1991.

Scott S. Snibbe, Kenneth P. Herndon, Daniel C. Robbins, D. Brookshire Conner, and Andries van Dam, "Using Deformations to Explore 3D Widget Design," Computer Graphics (SIGGRAPH '92 Proceedings), 26(2), pp. 351–352, Jul. 1992.

Marc P. Stevens, Robert C. Zeleznik, and John F. Hughes, "An Architecture for an Extensible 3D Interface Toolkit," Proceedings of UIST '94, ACM SIGGRAPH, Nov., 1994.

Paul S. Strauss, Rikk Carey, "An Object–Oriented 3D Graphics Toolkit," Computer Graphics (Proceedings of SIGGRAPH'92), 26(2), ACM SIGGRAPG, pp. 341–349, Jul. 1992.

Robert C. Zeleznik, Kenneth P. Herndon, Daniel C. Robbins, Nate Huang, Tom Meyer, Noah Parker and John F. Hughes, "An Interactive 3D Toolkit for Constructing 3D Widgets," Computer Graphics Annual Conference Series, (SIGGRAPH '93), pp. 81–84, Aug. 1–6, 1993.

DIRECT MANIPULATION OF TWO-DIMENSIONAL MOVING PICTURE STREAMS IN THREE-DIMENSIONAL SPACE

FIELD OF THE INVENTION

This application relates to video editing, and more particularly to a user interface for performing manipulations in three-dimensional space of a projection surface relative to a display surface.

BACKGROUND OF THE INVENTION

It is known to define transitions between sequences of digitally stored video samples using a digital media composing system. One such system is described in published PCT application No. WO 94/24814, issued on Oct. 27, 1994, and entitled "Method and User Interface for Creating, Specifying and Adjusting Motion Picture Transitions," assigned to Avid Technology, Inc. This system provides a user friendly approach to specifying transitions between scenes in a video composition, and is particularly helpful in defining the bounds of a transition (i.e. the starting points and ending points of a transition). It is also useful in defining the progression of a non-linear transition.

Three-dimensional transitions are also known. These transitions can include one image projection surface that appears to move in three dimensions in front of another. It is known to specify the movements of the apparent projection surface in three dimensions using numerical values or sliders to define its three-dimensional rotations or translations.

SUMMARY OF THE INVENTION

In one general aspect, the invention features a video editing method that includes displaying a two-dimensional projection of a representation of a projection surface. This projection is derived from a three-dimensional position of the surface. A handle is displayed attached to the projection, and the position of the surface is updated in a manner corresponding to the displacement of a cursor at the handle. The method further includes displaying a second projection derived from the updated position, and redisplaying the handle attached to it.

In preferred embodiments, the representation can be of a two-dimensional surface. The handle can be a rotation handle, and the position can be updated to correspond to a rotation around a predefined axis. A mode change command or a second handle can cause the rotation to be around a different, orthogonal axis. The method can display (e.g., as two dimensional projections) a rectangular frame associated with the representation and handles on opposing sides of it, and these handles can include a stem connected both to the rectangle and to a circular projection of a sphere. One handle can cease to be displayed upon detecting the cursor as it approaches another. The method can redisplay the cursor at a handle at the position the handle is at when it is redisplayed. Parameters that define a position can be stored, and the cursor can change appearance as it approaches a handle. The handle position can also be updated in a manner corresponding to the displacement of the cursor, and displaying the projection and handle can both display the same handle. A plurality of projections, and a plurality of handles can be displayed, and one or more of their positions updated, although only it is possible to limit these updates to translations. A continuous path such as a spline can be displayed between the projections. Possible handles can include a crop handle, a rotation handle, a translation handle, and a scaling handle, and the editor can select a mode that determines which type the handle is. The method can include displaying an effect made up of a series of projections of surfaces each having different positions defined by successive detecting and updating, with the surfaces each having different frames of a video sequence projected on them.

In another general aspect, the invention features a video composing system that includes a display screen, a pointing device, and a user interface module operatively connected to the screen and the input device. The user interface module displays a projection derived from a position of a surface, and displays a handle attached to this projection. The user interface module updates the position of the surface in a manner corresponding to the displacement of a cursor, and displays a projection derived from this updated position. It also redisplays the first handle attached to this projection.

In preferred embodiments, the system further includes storage operatively connected to the user interface module for storing effect parameters. The storage may be operatively connected to a display module, so the display module can retrieve video frames from the storage. The display module can display an effect that includes a series of projections of the surface in different positions, with each projection having a different video frame projected on it.

Embodiments according to the invention are advantageous in that they provide an improved user interface for specifying three-dimensional transitions. One significant benefit is that embodiments according to the invention permit a more intuitive user interface. This more intuitive user interface is advantageous because video editors can learn to use it quickly. In addition, once they have learned it they can use it efficiently, allowing editing tasks to be completed in shorter time periods. Furthermore, because the use of the interface itself is intuitive, editors can focus more of their efforts on the contents of their productions, rather than on the mechanics of manipulating the user interface.

By providing handles directly on the projection surface, editors can quickly understand their choices of three-dimensional operations, and make these choices rapidly. Since the editors can see the effect of the actuation of the handle as they actuate it, they can more quickly, intuitively, and/or precisely specify the transition. Furthermore, since the cursor remains with the handle, there is meaningful feedback between an editor's hand motion and his or her vision of the cursor and the moving projection surface.

BRIEF DESCRIPTION OF AN ILLUSTRATIVE EMBODIMENT

Figure 1:
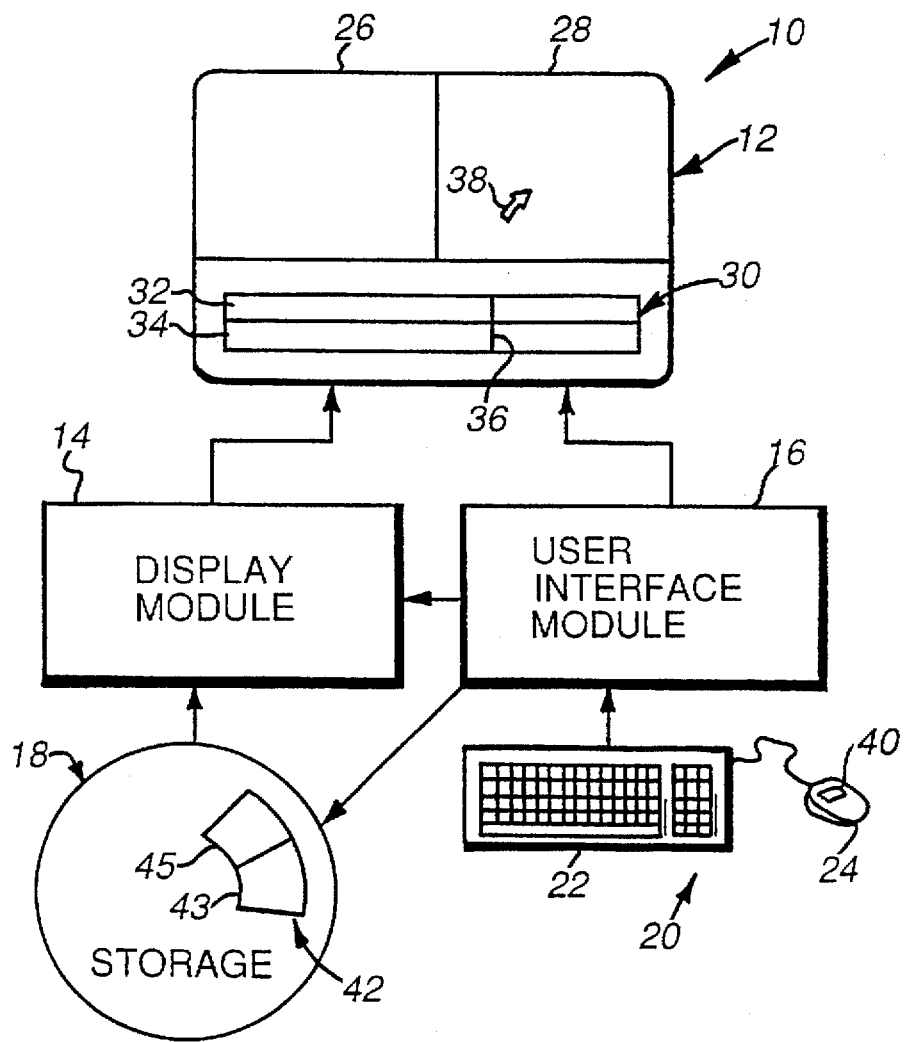
FIG. 1 is a diagrammatic block diagram of a media composing system according to the invention.

Referring to FIG. 1, a media composition system 10 includes a display 12, which is operatively connected to outputs of a display module 14 and a user interface module 16. Also included in this system is storage 18, which is operatively connected to an output of the user interface module and to an input of the display module. One or more user input devices, such as a keyboard 22 and a pointing device 24 (e.g., a mouse with a mouse button 40), are operatively connected to an input of the user interface module. Preferably, this media composition system is part of a larger media composition system that includes further structure and functionality for performing various video editing tasks. To the extent that this additional material is not relevant to the invention described herein, it has been omitted so as not to obfuscate the invention.

The display 12 of the media composition system 10 can be a video monitor, which includes a first display area 26, a second display area 28, and a multi-track time line 30. From the perspective of the editor using the system, the display can be configured with the first display area in the upper left-hand corner of the display, and the second display area in the upper right-hand corner. The time line can be placed below these two display areas and can include two or more individual track lines 32, 34, and one or more cursors 36.

The user interface module 16 can include device drivers to interpret input from the input devices 20, interface logic that defines the behavior of the user interface, and a display driver that displays elements of the user interface. Generally, the user interface module responds to input from the input devices and displays interface display information in the second display area 28. One well known way that the interface interacts with a user is to allow for user input from the pointing device 24 that depends on the position of a corresponding cursor 38. For example, if the cursor is placed on what is known as an icon, which is an identified area of the screen, and the user presses a button 40 associated with the pointing device, the user interface module can interpret this action as a predefined command associated with that icon.

The storage 18 is preferably a high capacity random access storage component, such as a hard disk drive. The storage provides storage areas termed files or records 42, in which information such as video sequences and effect parameters can be stored. Generally, effect parameters can be provided to the storage from the user interface module, and video sequences can be provided to the storage from external sources, such as a digitizer (not shown).

An input of the display module 14 can be operatively connected to an output of the user interface module 16. Through this connection, it can receive a display command, which will cause it to retrieve, from one or more of the records 42 in the storage 18, stored video sequences 43 and corresponding effects parameters 45 for displaying those sequences. It will then apply the effects parameters to the video sequences to configure each frame of the final sequence to be displayed, and display them successively in one of the display areas 26, 28.

The above-described display module and user interface module can be implemented using either dedicated electronic circuitry, software operating on a general purpose processing system, or a combination of the two. In one embodiment, the user interface module is implemented as a software program running on an Apple Power Macintosh 8100 computer. The display module is implemented as a combination of software on the computer and dedicated video acceleration hardware. In particular, the display module can employ a NuVista board made by TrueVision of Indianapolis, Ind., and an Aladdin digital video editing (DYE) system from Pinnacle Systems, of Sunnyvale, Calif. For further information about displaying video sequences in real time, refer to U.S. Pat. No. 5,355,450, entitled "MEDIA COMPOSER WITH ADJUSTABLE SOURCE MATERIAL COMPRESSION", and issued on Oct. 11, 1994; published PCT application No. WO 94/24815, published on Oct. 27, 1994, and entitled "MEDIA PIPELINE WITH MULTI-CHANNEL VIDEO PROCESSING AND PLAYBACK"; and co-pending U.S. patent application entitled "MEDIA PIPELINE WITH MECHANISM FOR REAL-TIME ADDITION OF DIGITAL VIDEO EFFECTS" filed Mar. 18, 1994, Ser. No. 08/214,605, which are herein incorporated by reference.

Figure 2:
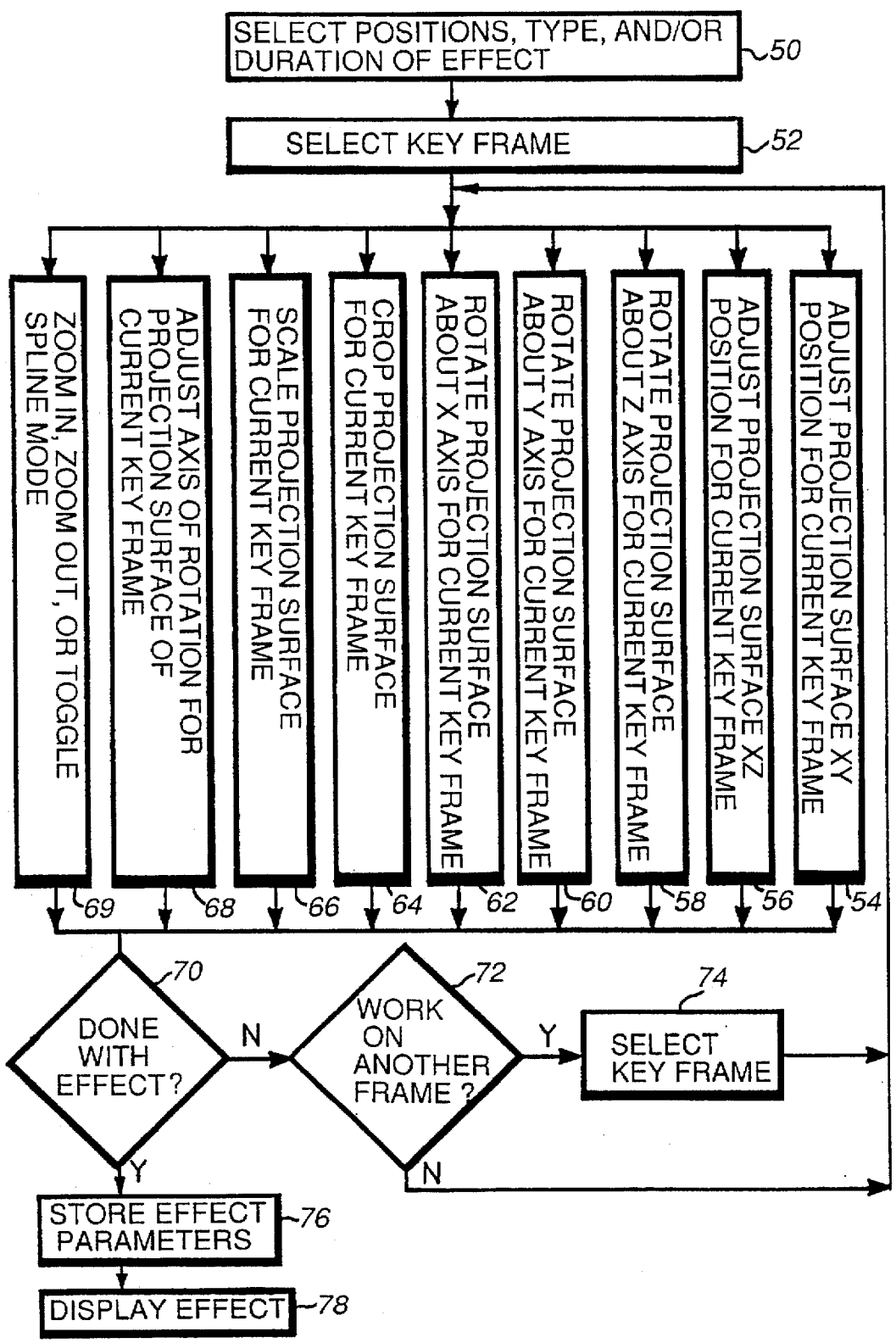
FIG. 2 is a diagrammatic flowchart illustrating the operation of the media composer of FIG. 1 in creating a three-dimensional effect.

In operation, referring to FIGS. 1 and 2, the definition of an effect begins with an effect selection step 50. During this step, the video editor employing the system determines the type, position, and/or duration of an effect. The type of the effect can be either a "track effect," or a "transition effect." In a transition effect, the three-dimensional effect takes place during the transition between a first scene and a second scene. For example, the first scene can be made to reduce in size in front of the second scene, and then move away, leaving only the second scene. This type of effect can be specified by selecting beginning and end points within each of two scenes by choosing positions on the two track lines 32, 34 of the time line 30 using the time line cursor 36. Alternatively, this type of effect can be specified by selecting a transition and then selecting a length for the transition and a relative starting position for the transition.

A track effect, on the other hand, begins and ends by displaying the same scene. In this type of effect, the editor specifies in and out points for a cut between scenes relative to the two different tracks. The effect then shows the effect with the second scene over the first scene, until at least the next cut.

Figure 3:
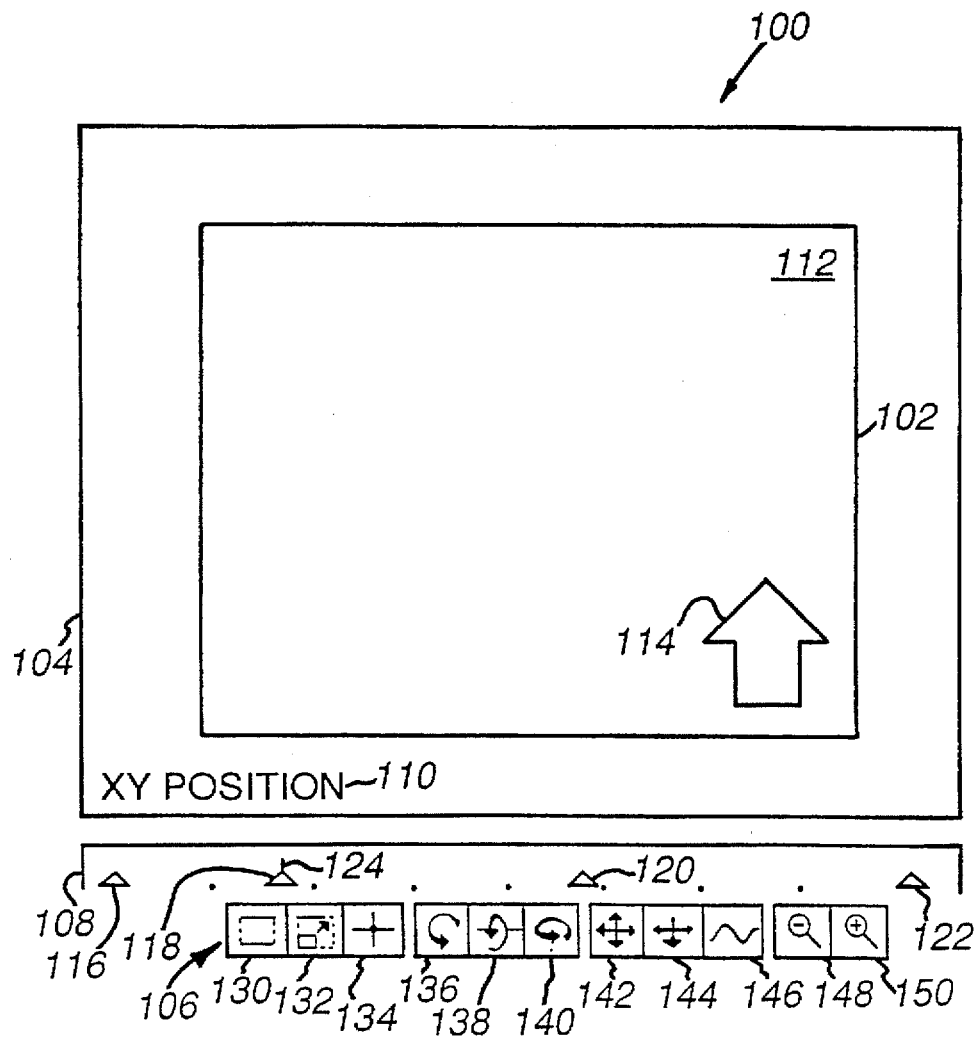
FIG. 3 is a plan view of the three-dimensional effect window of the display of the composer of FIG. 1 in its starting (or canonical) position, for a first embodiment of the invention.

Referring also to FIG. 3, once the editor has selected positions, a type, and/or a duration for the effect (step 50), the user interface module 16 displays an effects control panel 100 in the second display area 28. This control panel includes a screen area 102 surrounded by a margin area 104. The control panel also includes a button bar 106, a key frame time line 108, and a mode indicator 110. In one embodiment, the button bar is disposed horizontally below the margin area, and the key frame time line is disposed between the button bar and the key frame time line, although other arrangements are possible.

When the control panel 100 is first displayed, a projection surface 112 is displayed coextensive with the screen area 102. An orientation indicator 114 is displayed in association with this projection surface 112. For example, this indicator can be a squat, upward pointing arrow that is displayed in the lower right-hand corner of the projection area, and kept in the plane of the projection area.

The key frame time line 108 can display several key frame indicators 116, 118, 120, 122. These can be inserted by the editor, or alternatively provided in predetermined default positions along the key frame time line by the interface module 16. The time line can be designed to indicate increasing time values in a left-to-right direction. Each key frame indicator therefore corresponds to a frame at a point in time in the effect. The full length of the time line can correspond to the full duration of the effect, or it could correspond to a part of the duration of the effect.

The first step that the editor takes in using the control panel is to select a key frame (step 52), although one of the key frames could be selected as a default by the user interface module 16. Selection of a key frame can be performed by clicking on a pre-existing key frame indicator, or by creating a new key frame indicator, such as by first actuating on a create icon and then clicking on the time line. Once a key frame has been selected, this selection is affirmed by the user interface module displaying a key frame cursor 124 at the selected key frame.

The button bar 106 includes several control buttons 130, 132, 134, 136, 138, 140, 142, 144, 146, 148, 150. A first series of these represent three-dimensional operations that the user interface module 16 can perform on the projection surface 112, and can include a crop button 130, a scale button 132, an axis of rotation position button 134, a Z-axis rotation button 136, a Y-axis rotation button 138, an X-axis rotation button 140, an XY-position adjustment button 142, and an XZ-position adjustment button 144. A second series of buttons is independent of the first series and includes a motion path selection button 146, a zoom out button 148, and a zoom-in button 150.

Operation of the interface will now be further illustrated using a sequence of three-dimensional manipulations illustrated successively in FIGS. 4–10. The order of the sequence is illustrative only, as the editor can select any of the buttons in the button bar at any time during the creation of a three-dimensional effect. In particular, after selecting the current key frame (step 52), the editor can adjust the projection surface XY-position for the current key frame (step 54), adjust a projection surface XZ-position for the current key frame (step 56), rotate the projection surface about a Z-axis for the current key frame (step 58), rotate the projection surface about a Y-axis for the current key frame (step 60), rotate the projection surface about an X-axis for the current key frame (step 62), crop the projection surface for the current key frame (step 64), scale the projection surface for the current key frame (step 66), or adjust the axis of rotation for the projection surface of the current key frame (step 68). During any of these operations, the editor can actuate the motion path selection button 146, the zoom output button 148, or the zoom-in button 150 (step 69).

The orientation of the global X-axis is arbitrarily chosen to be in the left-to-right horizontal direction relative to the display, the global Y-axis is arbitrarily oriented to be vertical in the bottom-to-top direction relative to the display, and the global Z-axis is arbitrarily oriented to be normal to the plane of the display from the plane of the display in the direction of the editor. Projection surface-based X, Y, and Z axes are also defined, and these surface-based axes are coextensive with the global axes when the control panel is first displayed, in the position shown in FIG. 3. Three-dimensional manipulations of the projection surface, however, generally result in one or more of the surface-based axes ceasing to coextend with its corresponding global axis.

Figure 4:
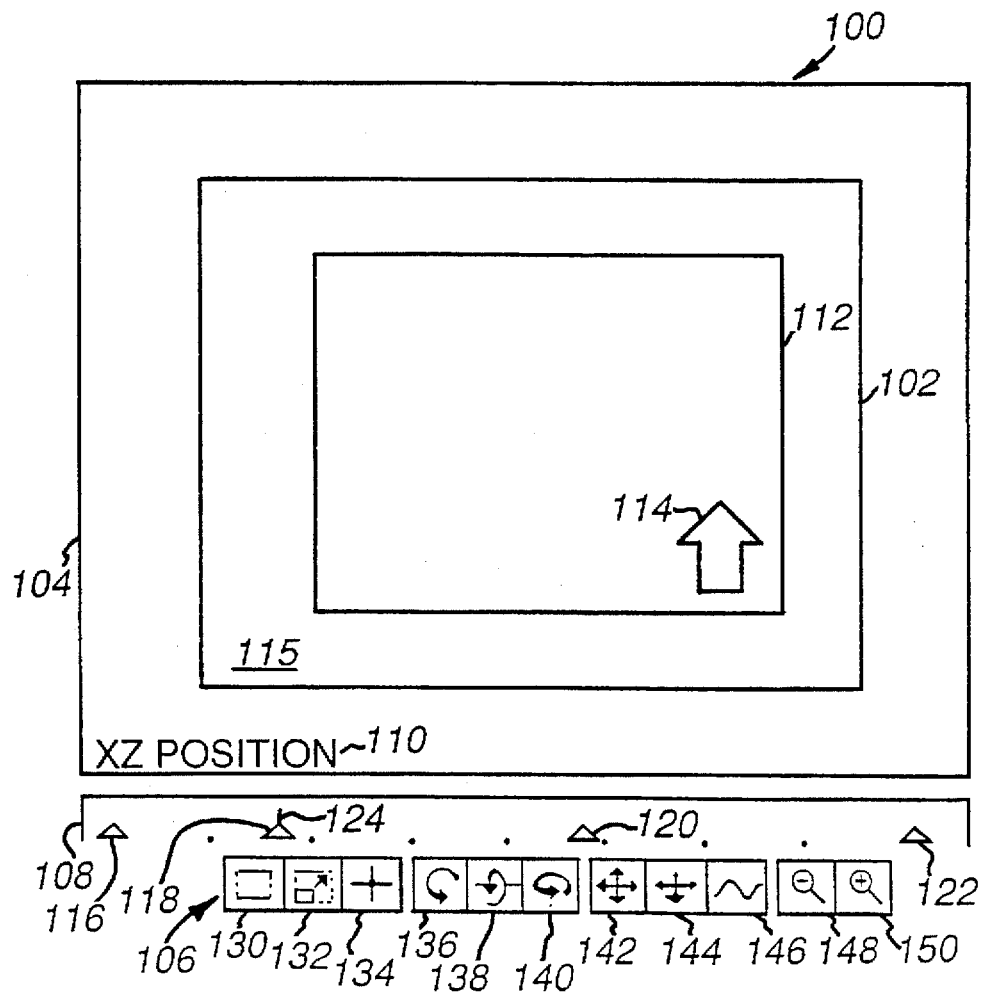
FIG. 4 shows the window of FIG. 3 after the XZ position of the projection surface has been adjusted.

Referring now also to FIG. 4, if the editor selects the XZ-position button 144, and then clicks with the pointing device 24 on the projection surface, moving the pointing device to the right will result in the projection surface 112 moving to the right, and moving the pointing device to the left will result in the projection surface moving to the left. Moving the pointing device up will result in the projection surface apparently moving toward the editor, and moving the pointing device down will result in the screen surface apparently moving away from the editor. The editor can move the projection surface about in any of these directions, until he or she is satisfied with the selected position. While the editor is doing this, the user interface module performs calculations to determine the appearance of the surface's theoretical three-dimensional position as it should be projected in two dimensions onto the display 12. These calculations can be performed using well known matrix transformation techniques.

In one embodiment, the projection surface 112 is represented by a wire frame outline, as is the orientation indicator 114. It is also possible to place a still or moving video frame in the projection surface, but the wire frame requires fewer computations. Another approach is to show a still or moving video frame in the projection surface when it is not moving, but to show a wire frame only while the editor is moving the projection surface.

Once the editor is satisfied with the XZ-position of the projection surface 112, he or she releases the button 40. As long as the control panel remains in XZ-position mode, as indicated by the mode indicator 110, the editor can again click on the projection surface and move it in X and Z directions. In the situation depicted in FIG. 4, the editor has released the frame in a position that has moved in the negative Z direction with respect to the initial position shown in FIG. 3. In effect, the editor has created the appearance of a movement of the projection surface away from the editor. In the area between the border of the screen area 102 and the projection surface 112, a portion 115 of the second video frame is now displayed.

At this point in time, if the editor is not done with the desired effect (step 70), he or she can decide (step 72) to select another key frame (step 74), or perform another one of the operations initiated by the button bar 106 on the current key frame (step 54, 55, 58, 60, 62, 64, 66, 68, or 69). In the illustrative sequence, the editor selects the Y-rotation button 136 to initiate Y-axis rotation of the projection surface for the current key frame (step 60).

Figure 5:
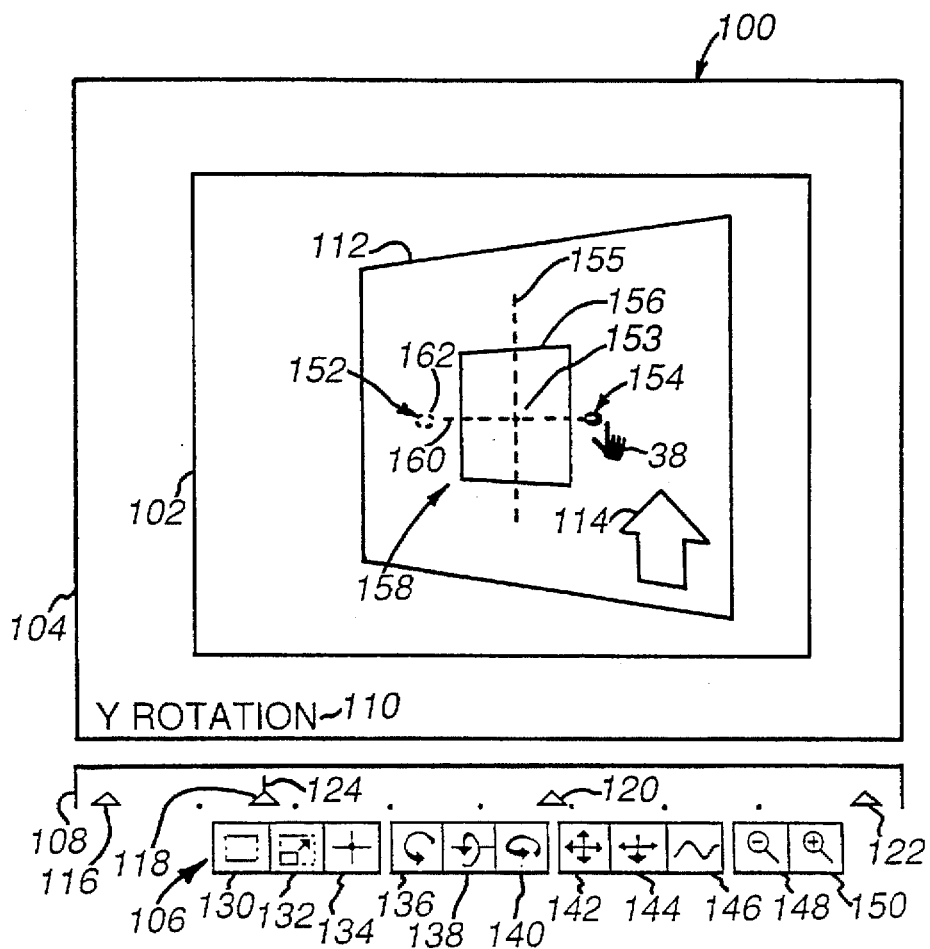
FIG. 5 shows the window of FIG. 4 during a Y axis rotation operation.

Referring now also to FIG. 5, upon selection of the Y-rotation icon 138, the user interface module displays a Y position indicator icon 158, in a position centered around the currently selected axis of rotation 153 of the projection surface 112 (this position defaults to the center of the surface). The Y icon includes a rectangular frame 156 disposed in an upright position and bisected by a Y-rotation centerline 155 that is oriented in the direction of the global Y-axis such that it passes through the currently selected axis of rotation. The currently selected axis of rotation, and the Y-rotation centerline need not be displayed in the Y-rotation mode.

Disposed on the edges of the rectangular frame 156 that are on opposite sides of the Y-rotation centerline 155, are first and second handles 152, 154. These can be made up of a knob 162, and a stem 160, which projects from the perimeter of the rectangle at its midpoint to the knob. These knobs can be made to be spherical, so they will appear circular regardless of the orientation of the projection surface 112.

The editor interacts with the handles 152, 154 by positioning the cursor 38 on one of them. As the cursor approaches one of the handles 154, the user interface module 16 can change the shape of the cursor from a default shape, such as an arrow, to a different shape, such as a hand. This visually indicates that the cursor is ready to interact with that handle. The editor can then decide to select that handle by clicking the pointing device button 40 when the pointer is shown in this different state.

Once one of the handles 154 is selected, the editor's cursor 38 movements will cause the projection surface to rotate about the Y-rotation centerline. Moving the handle toward the center of projection surface will appear to pull the handle, and therefore one side of the projection surface, toward the editor. For example, in the frame shown in FIG. 5, the editor has moved the cursor towards the Y-rotation centerline, effectively pulling the right side of the projection surface towards him or her, and thereby moving the left side of the projection surface away from him or her. Note that only the selected handle need be displayed during manipulation.

As the editor moves the handles, the user interface module 16 obtains two-dimensional coordinates for the cursor 38, and translates these two-dimensional coordinates into a set of three-dimensional position values that it uses to re-position the projection surface. This is done using an inverse transformation matrix derived from the transformations performed on the projection surface to position it in its current position.

Moving the handle in the opposite direction will cause the projection surface to move in the opposite direction. If the editor attempts to move the cursor outside of the area that the handles can reach in Y-rotation mode, however, the cursor leaves the handle, and the handle remains on a line between the cursor position and the center of rotation of the display surface. The user will therefore still be able to manipulate the projection surface with the cursor off of the handle. Note that if the user actuates the button 40 on the projection surface while the cursor is not at one of the handles, an XY translation operation is available. The user can rotate the projection surface all the way around, except when the path of the handle would not map to an ellipse. If the editor presses a key on the keyboard, such as the shift key, while he or she moves the handle, the interface will cause the rotation to be quantized to 15-degree increments.

This interface is beneficial in that the handles provide clearly marked areas that the editor can select to adjust the position of the projection surface, intuitively inviting interaction with the editor. Since the handles are always spherical, the handles will be visible when the projection surface is positioned at any angle. In addition, since the cursor 38 remains visible near or on the handles during manipulation of the object, the editor receives clear visual feedback during the three-dimensional manipulations performed using the handles.

If the editor were to use one of the handles 152, 154 to turn the projection surface 112 all the way around, such that the back of the projection surface were shown, the position indicator 114 would no longer be shown in outline the lower right-hand corner of the frame, but would be shown filled-in in the lower left-hand corner of the projection surface. This is a clear indicator to the editor that the back of the frame is now being displayed. This could result in the video frame being displayed backwards, which may or may not be desirable.

As the editor uses one of the handles 152, 154 to rotate the projection surface 112, the user interface module causes the rectangular frame 156 and handles to change their perspective, much as it changes the perspective of the projection surface itself. This adds an additional visual cue to allow the editor to visualize the effect that the manipulation is having on the image. Once the editor is satisfied with the selected position, the editor releases the handle by letting go of the button 40. As with the other effects, the editor can then reselect one of the two handles and perform further Y-rotation operations if desired.

Figure 6:
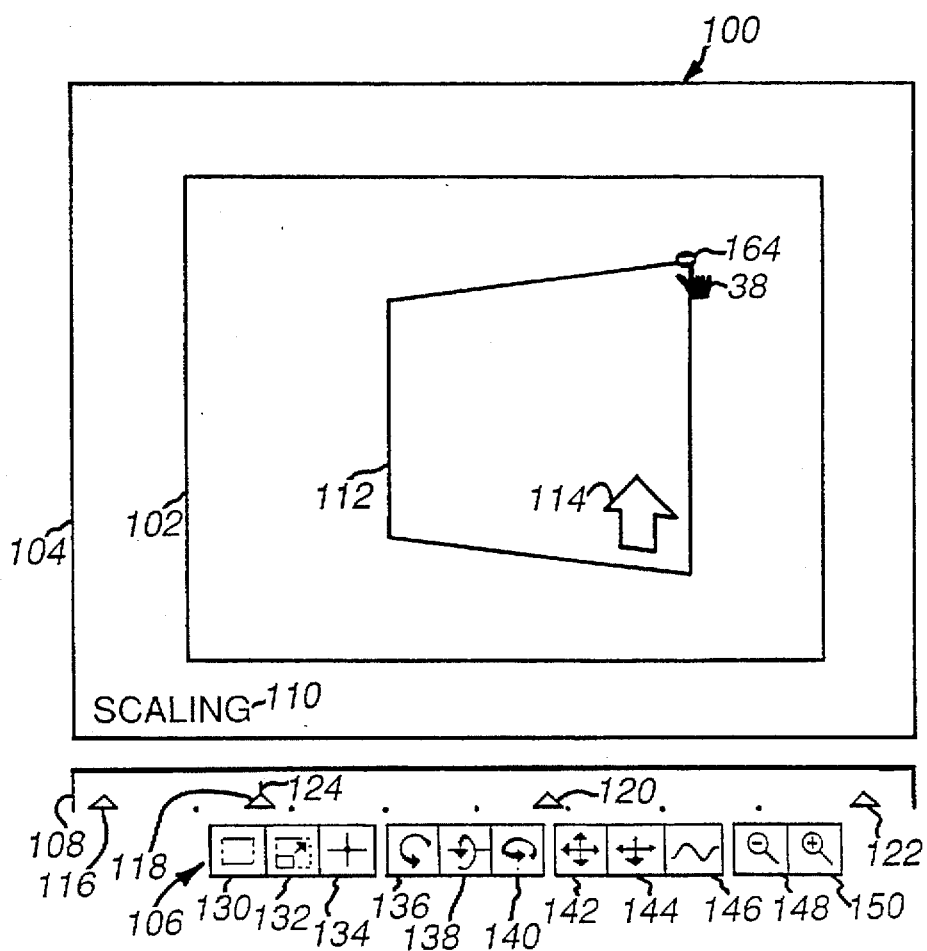
FIG. 6 shows the window of FIG. 5 during a scaling operation.

Referring now also to FIG. 6, the next three-dimensional manipulation shown in the illustrative sequence is a scaling operation, which can be selected by clicking on the scaling button 132. When the scaling mode is selected, a scaling handle 164 is displayed in one of the corners of the projection surface 112, such as the upper right-hand corner. The editor selects this handle much like he or she would select the handles in the Y-rotation mode. When the editor moves this handle, however, it scales the image.

Normally, during the scaling operation the aspect ratio of the projection surface 112 is maintained, but if the editor presses a key (e.g., "control") on the keyboard, while clicking the pointing device button 40, movements of the scaling handle 164 will not preserve the aspect ratio. In the normal mode, moving the handle in a direction generally away from the center of the projection surface will make it larger, whereas moving it generally towards the center will make it smaller. In the mode that does not preserve the aspect ratio, movements along the surface X-axis will change the X-dimension of the surface, and movements along the surface Y-axis will result in changes in the Y-dimension of the surface.

Once the editor has determined the appropriate scale for the projection surface 112, the editor can release the scaling handle 164. In the example shown in FIG. 6, the editor has slightly reduced the size of the projection surface.

Figure 7:
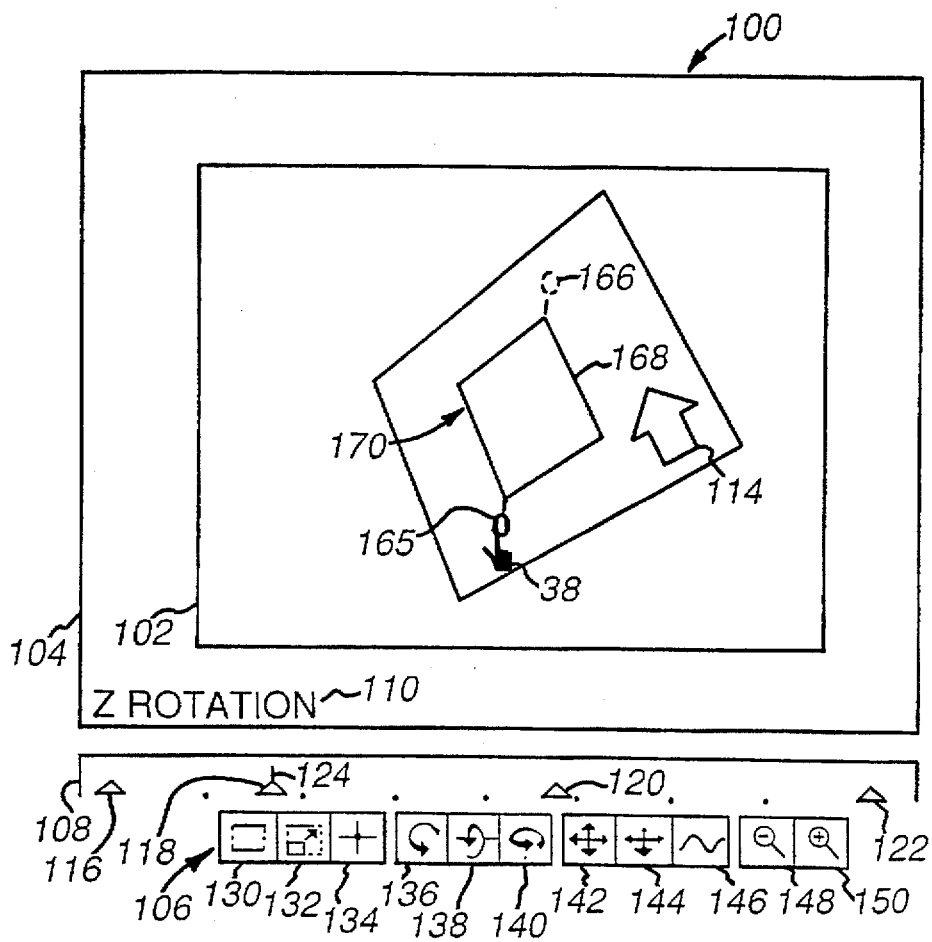
FIG. 7 shows the window of FIG. 6 during a Z axis rotation operation.

Referring now also to FIG. 7, the next manipulation in the illustrative sequence is a rotation about the projection surface Z-axis. In this mode, a rectangular frame 168, of a Z-rotation icon 170 is oriented normal to the surface Z-axis, with its edges parallel to those of the projection surface 112, and with the surface Z-axis at its center. Two handles 166 are placed on diagonally opposing corners of the Z-rotation rectangular frame. Once a handle is selected, the editor can move the pointing device in a generally clockwise direction to cause the projection surface to move in a clockwise direction, and conversely move the pointing device in a generally counterclockwise direction to move the projection surface in a counterclockwise direction. In other respects, operation of this mode is similar to the Y-rotation mode. In the manipulation shown in FIG. 7, the editor has rotated the projection surface slightly in the counterclockwise direction.

Figure 8:
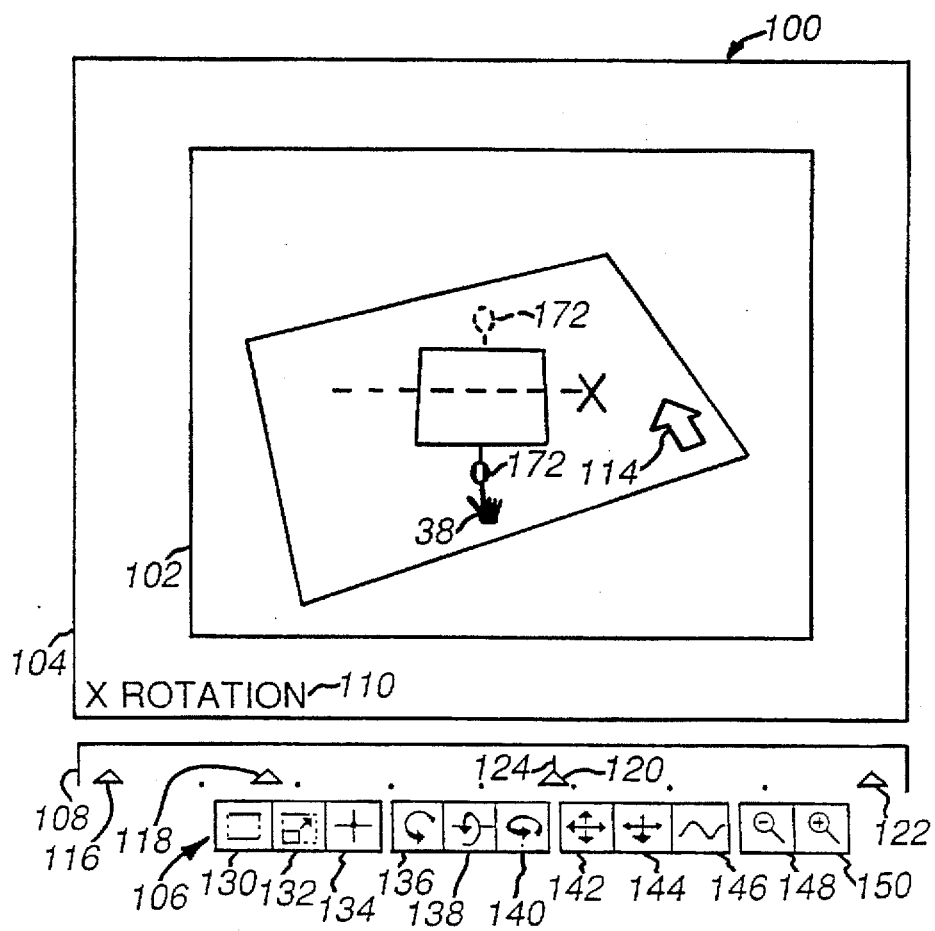
FIG. 8 shows the window of FIG. 7 during a Y axis rotation operation.

Referring now also to FIG. 8, the next operation performed in the illustrative sequence is an X-axis rotation. This operation is similar to the Y-rotation operation shown and described in connection with FIG. 5, except that this manipulation is performed with one of two X-rotation handles 172 about an X-rotation centerline 172 instead of the Y-rotation centerline 155. The X-rotation centerline passes through the axis of rotation 153 of the projection surface 112 in the direction of the global X-axis.

In the embodiment described above in connection with FIGS. 1–10, the three-dimensional manipulations are applied to the projection surface 112 in a defined order. This order corresponds to the left-to-right progression of the buttons in the button bar. As a result, the three types of rotation act slightly differently in situations where the projection surface is rotated in more than one direction. In particular, rotation about the Z-axis always, corresponds to a rotation about the projection surfaces local Z-axis. Rotation about the Y-axis is always performed about the global Y-axis. Rotation about the X-axis is performed about an X-rotation centerline, which is derived from both the surface and global X-axes. In particular, this X-rotation centerline is located in the plane of the surface, but parallel to the global X-axis. Because of the order of operations, the sides of the icon used for X-rotation are not always parallel with the sides of the projection surface, and the icon used for rotation is not always shown co-planar with the projection surface.

Figure 9:
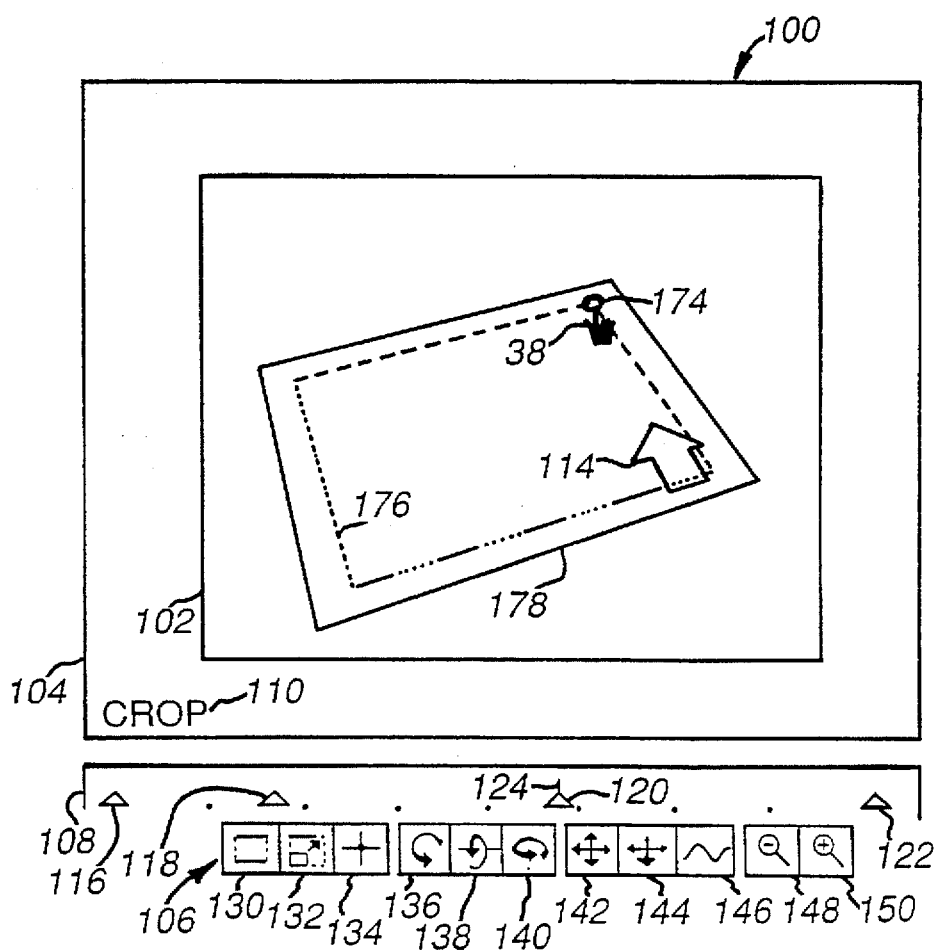
FIG. 9 shows the window of FIG. 8 during a cropping operation.

Referring now also to FIG. 9, the next operation in the exemplary sequence is to crop the projection surface 112. This manipulation is performed with a crop handle 174 in much the same way as a scaling operation, except that instead of proportionately reducing the size of the projection surface, this operation displays a smaller portion of the image on the projection surface. In addition, as the editor adjusts the cropping operation, a phantom outline 176 of the cropped size image is displayed, while a wire frame 178 that the full projection surface would occupy is still displayed. This gives the editor a sense of the amount of the surface that has been cropped. Once this manipulation is complete, the cropped image alone is displayed in the now smaller projection surface.

Figure 10:
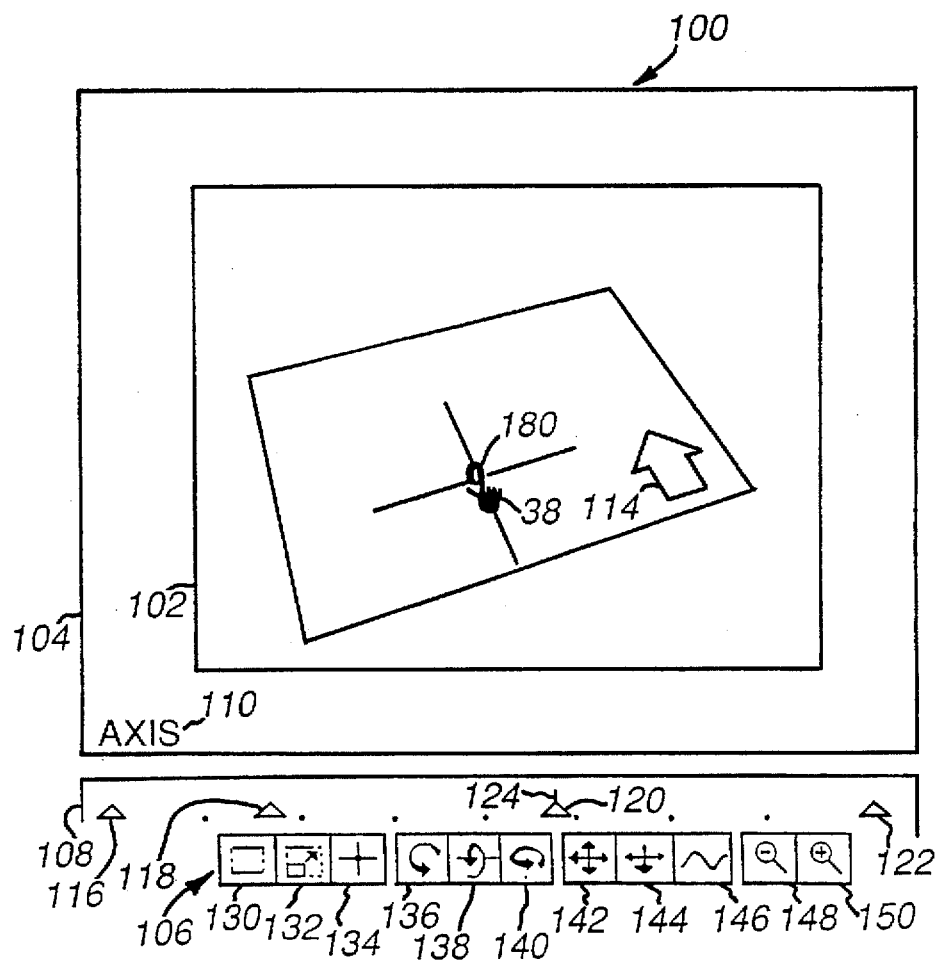
FIG. 10 shows the window of FIG. 9 as the axis of rotation of the projection surface is moved.

Referring now also to FIG. 10, the next operation in the illustrative sequence is to adjust the position of the center of rotation 153. This operation allows any of the three rotation operations to be based on a different position on the projection surface 112. The default for the position of the center of rotation is the center of the projection surface. The user interface module 16, in this mode, presents the editor with a center adjusting handle 180 at the position that the center of rotation currently occupies, as well as an X line segment 182 and a Y line segment 184 that form a crosshair with the handle at the center.

In most of the three-dimensional manipulation operations, the editor can actually move portions of the projection surface out of the screen area 102 into the margin area 104. This is known as an underscan capability and it allows the editor to create an effect where the moving projection surface moves off screen leaving only the second scene visible. To use this underscan capability more effectively, the zoom-out button 150 can be used to make the margins larger, and the zoom-in button 148 can be used to make the margins smaller. Note that when the control panel 100 is first displayed, it may or may not exhibit some amount of underscan.

Figure 11:
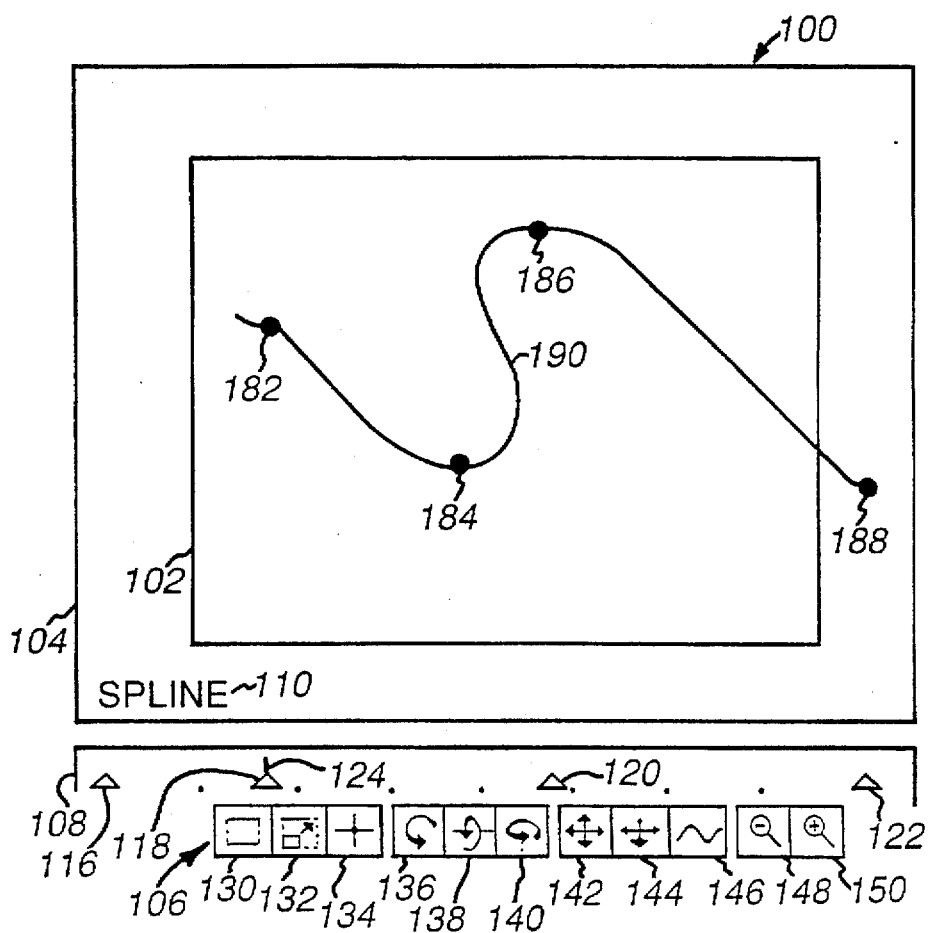
FIG. 11 shows the window of FIG. 3 in its motion path selection mode.

Referring to FIG. 11, the motion path selection button 146 allows the editor to visualize and manipulate the key frames in the path that the projection surface will take as the effect is displayed. This movement can be linear, or along a spline-shaped path. The spline-shaped path is calculated by the user interface module using known techniques. These techniques are described in "Interpolating Splines With Local Tension, Continuity, and Bias Control" by Doris H. Kochanek, Computer Graphics, Vol. 18, No. 3, Jul. 1984. Adjustment of the tension, continuity and bias parameters for the path can be done in response to numerical parameters from the keyboard, or in response to the movement of sliders.

When the editor has specified three-dimensional positions for the key frames 116, 118, 120, 122 for the effect, the editor can select the motion path selection button 146 to display a series of points 182, 184, 186, 188 that are located at the position of the center of the projection surface 112 for each key frame, respectively. In this mode, these points will be connected by a three-dimensional spline 190 that the user interface module 16 derives. This spline will define the position of the center of the projection surface for each frame during the effect. For example, in the screen illustrated in FIG. 11, the effect will begin with the projection surface near the upper left-hand corner of the screen, and it will proceed downwards towards the lower center of the screen and then again upwards towards the upper center of the screen, and finally downwards and off of the screen. The zoom-in button 148, and the zoom-out button 150 can be used to see portions of the path that take the projection surface out of the display screen 102.

In motion path selection mode, the points 182, 184, 186, and 188 can be displayed as handles, and the editor can use these handles to manipulate either the XY or XZ position of these points. This will have the effect of moving the position of the frames corresponding to these handles. By selecting the handles with a key (e.g., shift) depressed, more than one point can be moved through the same translation in one operation. It is also possible to operate more than one key frame by actuating on the key frame indicators themselves in this way. This causes the position of the last selected key frame to be applied to all of the other selected key frames. Cut and paste operations are also available for key frames.

When the editor is satisfied with the definition of all of the key frames, and has specified the type of path, he or she can store the parameters for the effect (step 76). This step stores transformation parameters for each key frame, which defines the position of the projection surface that resulted from all of the manipulations performed on it. It also stores interpolated matrices for frames that are not associated with key frames. These are derived by linear interpolation or spline-based interpolation along the chosen path of the projection surface. Therefore, each frame in the sequence that forms the effect is associated with position parameters.

When the editor issues a command through one of the display devices 20 to display the effect, the display module retrieves each frame and its associated transformation parameters and uses the transformation parameters to determine the apparent three-dimensional position at which the projection surface is to be displayed. The parameters for each frame include one transformation matrix for each type of transformation.

It may be desirable to provide alternate controls for the above-described manipulations. In one embodiment, these alternate controls are displayed in a parameter list in the first display area 26. This parameter list includes collapsible areas that allow the editor to use sliders and/or numerical values to specify the manipulations, instead of the above-described manipulations. This parameter list can also include controls for other parameters. For example, parameters for the shape of the spline can be specified, and key frames created using this list. Other effects such as perspective, skew, borders, shadows, or trails could also be provided in this list.

Figure 12:
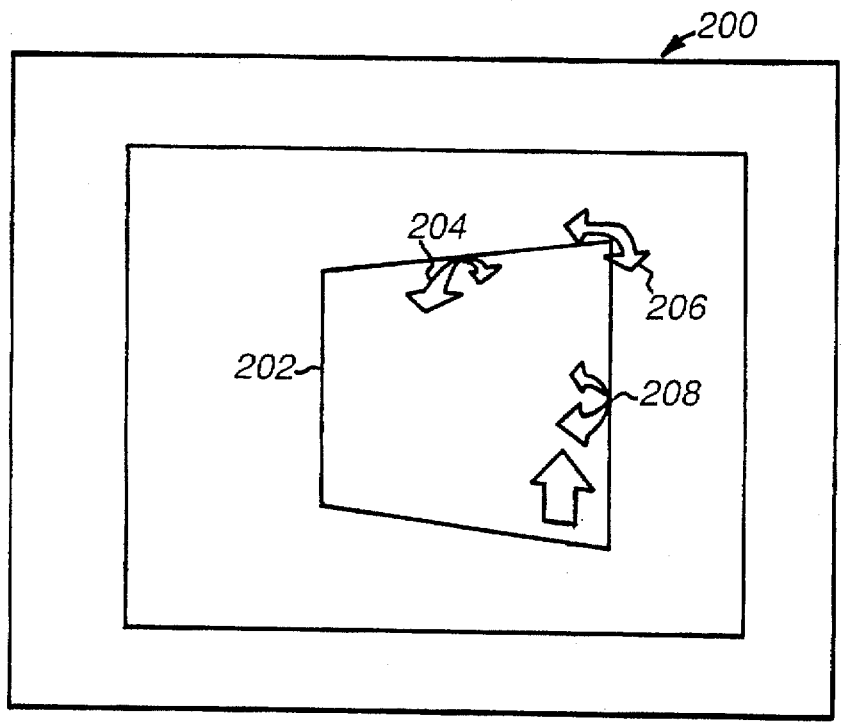
FIG. 12 is a plan view of the three-dimensional effect window of the display of the composer of FIG. 1 for a second embodiment of the invention, showing the window in its rotation control mode.
Figure 13:
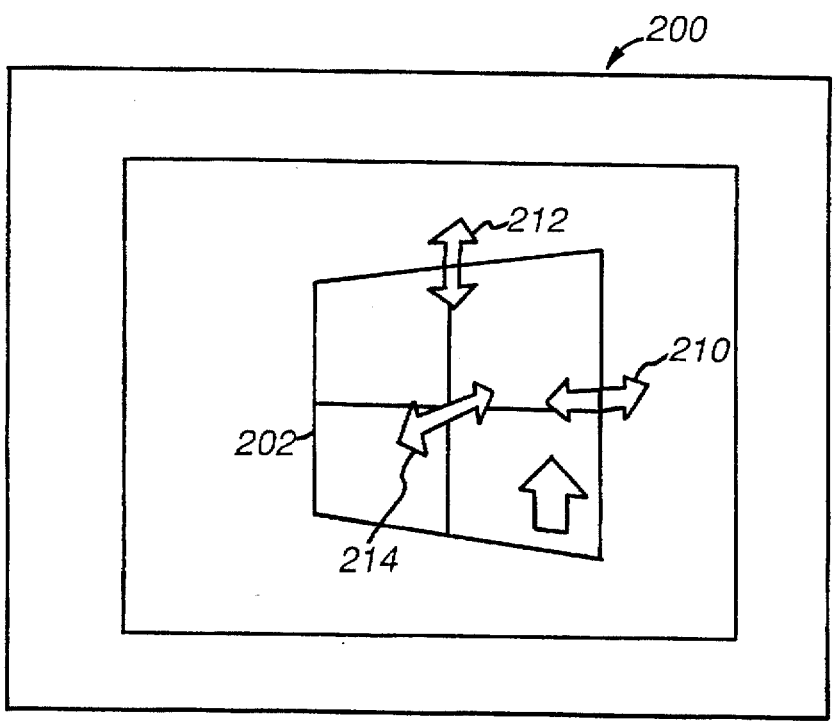
FIG. 13 shows the window of FIG. 12 in its translation control mode.

Referring to FIGS. 12–13, an alternative embodiment of the invention presents a control panel 200 that allows an editor to manipulate a projection surface 212 using different controls from those of the embodiment discussed above in connection with FIGS. 1–11. In particular, as shown in FIG.

12, this embodiment includes a multi-purpose rotation mode in which the editor can actuate either a rotate X-handle 204, a rotate Z-handle 206, or a rotate Y-handle 208. In this mode, the editor can rotate the projection surface in any of these three directions, without switching between modes. Preferably, the handles are shaped like curved arrows drawn in perspective, which arrows are curved in a direction that is generally aligned with the direction that actuation of the handle will move the handle in.

Similarly, as shown in FIG. 13, the alternative embodiment of the invention can provide a translate X-handle 210, a translate Y-handle 212, and a translate Z-handle 214 in a multi-purpose translation mode. These handles allow the editor to translate the projection surface in any of these three directions, without changing modes. Switching between modes in the second embodiment of the invention can be performed using a button bar, or other input mechanisms. Cropping, scaling, center of rotation adjusting, motion path selection, and zoom buttons may also be provided in this interface.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A video editing method, comprising:
   displaying on a display screen a first two-dimensional projection of a representation of a projection surface, the two-dimensional projection being derived from a first three-dimensional position of the projection surface,
   displaying a first handle attached to the first two-dimensional protection,
   detecting displacement at the first handle of a cursor responsive to a pointing device,
   updating the first three-dimensional position of the projection surface in a manner corresponding to the amount and direction of the displacement of the cursor,
   displaying on a display screen a second two-dimensional projection of the representation of the projection surface, the second two-dimensional projection being derived from the updated first three-dimensional position of the projection surface, and
   redisplaying the first handle attached to the second two-dimensional projection, wherein the step of redisplaying redisplays the cursor at the first handle in the position the handle occupies after the step of redisplaying the first handle.

2. The video editing method of claim 1, wherein the steps of displaying on a display screen display a two-dimensional projection of a two-dimensional representation of the projection surface.

3. The video editing method of claim 1, wherein the step of displaying a first handle displays a rotation handle, and wherein the step of updating the position updates the first three-dimensional position of the representation to correspond to a rotation of the representation around a first predefined axis.

4. The video editing method of claim 3, further including the step of responding to a mode change command to cause the step of displaying a first handle to display a different rotation handle, and wherein the step of updating the position updates the three-dimensional position of the representation to correspond to a rotation of the representation around a second predefined axis orthogonal to the first predefined axis.

5. The video editing method of claim 3, further including the steps of:
   displaying a second rotation handle attached to the first two-dimensional projection concurrently with the step of displaying a first rotation handle,
   detecting displacement at the second handle of the cursor responsive to the pointing device,
   again updating the first three-dimensional position of the projection surface in a manner corresponding to the amount and direction of the displacement of the cursor during the displacement, the step of again updating corresponding to a rotation of the representation around a second predefined axis orthogonal to the first predefined axis,
   displaying on a display screen a third two-dimensional projection of the representation of the projection surface, the third two-dimensional projection being derived from the again updated first three-dimensional position of the projection surface, and
   redisplaying the second rotation handle attached to the third two-dimensional projection.

6. The video editing method of claim 1, further including the step of displaying a rectangular frame associated with the representation, wherein the step of displaying a handle displays a handle on one side of the rectangular frame, and further including the step of displaying a second handle on another side of the rectangular frame opposite the one side of the rectangular frame.

7. The method of claim 6, wherein the steps of displaying handles and displaying a rectangular frame display the handles and rectangular frame as two-dimensional projections of three-dimensional objects.

8. The video editing method of claim 1 further including the step of storing effect parameters that define the second three-dimensional position.

9. The video editing method of claim 1, wherein the step of displaying a first projection displays a plurality of first projections,
   wherein the step of displaying a handle displays a plurality of handles, each connected to one of the plurality of first projections,
   wherein the step of detecting displacement detects displacement of one of the plurality of handles,
   wherein the step of updating the three-dimensional position updates the position of the one of the plurality of first projections,
   wherein the step of displaying a second projection displays a projection of a representation of the one of the plurality of first projections, and
   wherein the step of redisplaying redisplays the one of the plurality of handles.

10. The method of claim 9 further including the step of displaying a continuous path between the plurality of projections.

11. The video editing method of claim 10, wherein the step of displaying a continuous path displays a spline.

12. The video editing method of claim 10, wherein the step of updating only allows translation operations.

13. The video editing method of claim 10, wherein the step of updating the three-dimensional position updates the position of more than one of the plurality of first projections.

14. The video editing method of claim 1 wherein the handle is one of a crop handle, a rotation handle, a translation handle, and a scaling handle, and further including the step of selecting a mode that determines which type the handle is.

15. The video editing method of claim 1 further including the step of displaying an effect made up of a series of two-dimensional projections of different projection surfaces each having different three-dimensional positions, the different three-dimensional positions having been defined by successive ones of the steps of detecting and updating, the different projection surfaces each having different frames of a video sequence projected thereon.

16. A video editing method, comprising:

displaying on a display screen a first two-dimensional projection of a representation of a projection surface, the two-dimensional projection being derived from a first three-dimensional position of the projection surface, displaying a first handle attached to the first two-dimensional projection, detecting displacement at the first handle of a cursor responsive to a pointing device, updating the first three-dimensional position of the projection surface in a manner corresponding to the amount and direction of the displacement of the cursor, displaying on a display screen a second two-dimensional projection of the representation of the projection surface, the second two-dimensional projection being derived from the updated first three-dimensional position of the projection surface, redisplaying the first handle attached to the second two-dimensional projection displaying a rectangular frame associated with the representation, wherein the step of displaying a handle displays a handle on one side of the rectangular frame, displaying a second handle on another side of the rectangular frame opposite the one side of the rectangular frame, and wherein the steps of displaying handles each display a handle that includes a stem connected to the rectangle and a circular projection of a sphere connected to their respective stem.

17. A video editing method, comprising:

displaying on a display screen a first two-dimensional projection of a representation of a projection surface, the two-dimensional projection being derived from a first three-dimensional position of the projection surface, displaying a first handle attached to the first two-dimensional projection, detecting displacement at the first handle of a cursor responsive to a pointing device, updating the first three-dimensional position of the projection surface in a manner corresponding to the amount and direction of the displacement of the cursor, displaying on a display screen a second two-dimensional projection of the representation of the projection surface, the second two-dimensional projection being derived from the updated first three-dimensional position of the projection surface, redisplaying the first handle attached to the second two-dimensional projection displaying a rectangular frame associated with the representation, wherein the step of displaying a handle displays a handle on one side of the rectangular frame, displaying a second handle on another side of the rectangular frame opposite the one side of the rectangular frame, and ceasing to display the second handle upon the detection of the cursor as it approaches the first handle.

18. The video editing method of claim 17, further including the step of displaying a rectangular frame associated with the representation, wherein the step of displaying a handle displays a handle on one side of the rectangular frame, and further including the step of displaying a second handle on another side of the rectangular frame opposite the one side of the rectangular frame.

19. The video editing method of claim 17 further including the step of displaying an effect made up of a series of two-dimensional projections of different projection surfaces each having different three-dimensional positions, the different three-dimensional positions having been defined by successive ones of the steps of detecting and updating, the different projection surfaces each having different frames of a video sequence projected thereon.

20. A video editing method, comprising:

displaying on a display screen a first two-dimensional projection of a representation of a projection surface, the two-dimensional projection being derived from a first three-dimensional position of the projection surface, displaying a first handle attached to the first two-dimensional projection, detecting displacement at the first handle of a cursor responsive to a pointing device, updating the first three-dimensional position of the projection surface in a manner corresponding to the amount and direction of the displacement of the cursor, displaying on a display screen a second two-dimensional projection of the representation of the projection surface, the second two-dimensional projection being derived from the updated first three-dimensional position of the projection surface, redisplaying the first handle attached to the second two-dimensional projection, and wherein the step of displaying a handle displays a handle that includes a stem and a circular projection of a sphere connected to the stem.

21. The video editing method of claim 20, further including the step of displaying a rectangular frame associated with the representation, wherein the step of displaying a handle displays a handle on one side of the rectangular frame, and further including the step of displaying a second handle on another side of the rectangular frame opposite the one side of the rectangular frame.

22. The video editing method of claim 20 further including the step of displaying an effect made up of a series of two-dimensional projections of different projection surfaces each having different three-dimensional positions, the different three-dimensional positions having been defined by successive ones of the steps of detecting and updating, the different projection surfaces each having different frames of a video sequence projected thereon.

23. A video editing method, comprising:

displaying on a display screen a first two-dimensional projection of a representation of a projection surface, the two-dimensional projection being derived from a first three-dimensional position of the projection surface, displaying a first handle attached to the first two-dimensional projection, detecting displacement at the first handle of a cursor responsive to a pointing device, updating the first three-dimensional position of the projection surface in a manner corresponding to the amount and direction of the displacement of the cursor, displaying on a display screen a second two-dimensional projection of the representation of the projection surface, the second two-dimensional projection being derived from the updated first three-dimensional position of the projection surface, redisplaying the first handle attached to the second two-dimensional projection, and changing the appearance of the cursor as it approaches the first handle.

24. The video editing method of claim 23, further including the step of displaying a rectangular frame associated with the representation, wherein the step of displaying a handle displays a handle on one side of the rectangular frame, and further including the step of displaying a second handle on another side of the rectangular frame opposite the one side of the rectangular frame.

25. The video editing method of claim 23 further including the step of displaying an effect made up of a series of two-dimensional projections of different projection surfaces each having different three-dimensional positions, the different three-dimensional positions having been defined by successive ones of the steps of detecting and updating, the different projection surfaces each having different frames of a video sequence projected thereon.

26. A video composing system, comprising:

a display screen, a pointing device, and a user interface module operatively connected to the display screen and to the user input device, the user interface module being for displaying on the display screen a first two-dimensional projection of a representation of a projection surface, the two-dimensional projection being derived from a first three-dimensional position of the projection surface; the user interface module also being for displaying a first handle attached to the first two-dimensional projection; the user interface module also being for detecting displacement at the first handle of a cursor responsive to the pointing device; the user interface module also being for updating the first three-dimensional position of the projection surface in a manner corresponding to the amount and direction of the displacement of the cursor; the user interface module also being for displaying on the display screen a second two-dimensional projection of the representation of the projection surface, the second two-dimensional projection being derived from the updated first three-dimensional position of the projection surface; and the user interface module further being for redisplaying the first handle attached to the second two-dimensional projection and for redisplaying the cursor at the first handle in the position the handle occupies after redisplaying the first handle.

27. The video composing system of claim 26 further including storage operatively connected to the user interface module for storing effect parameters that define the second three-dimensional position.

28. The video composing system of claim 26 further including a display module operatively connected to the storage; wherein the display module is for retrieving a series of video frames from the storage; wherein the display module is also for displaying an effect comprising a series of further two-dimensional projections of the projection surface in different three-dimensional positions; each further two-dimensional projection of the surface having a different one of the video frames projected thereon; and wherein the user interface module is further for obtaining and storing the different three-dimensional positions.

29. A video composing system, comprising:

a display screen, a pointing device, and a user interface module operatively connected to the display screen and to the user input device, the user interface module being for displaying on the display screen a first two-dimensional projection of a representation of a projection surface, the two-dimensional projection being derived from a first three-dimensional position of the projection surface; the user interface module also being for displaying a first handle attached to the first two-dimensional projection; the user interface module also being for detecting displacement at the first handle of a cursor responsive to the pointing device; the user interface module also being for updating the first three-dimensional position of the projection surface in a manner corresponding to the amount and direction of the displacement of the cursor; the user interface module also being for displaying on the display screen a second two-dimensional projection of the representation of the projection surface, the second two-dimensional projection being derived from the updated first three-dimensional position of the projection surface; the user interface module also being for redisplaying the first handle attached to the second two-dimensional projection; the user interface module also being for displaying a rectangular frame associated with the representation and for displaying a handle on one side of the rectangular frame; the user interface module also being for displaying a second handle on another side of the rectangular frame opposite the one side of the rectangular frame; and the user interface module further being for ceasing to display the second handle upon the detection of the cursor as it approaches the first handle.

30. A video composing system, comprising:

a display screen, a pointing device, and a user interface module operatively connected to the display screen and to the user input device, the user interface module being for displaying on the display screen a first two-dimensional projection of a representation of a projection surface, the two-dimensional projection being derived from a first three-dimensional position of the projection surface; the user interface module also being for displaying a first handle attached to the first two-dimensional projection, which handle includes a stem and a circular projection of a sphere connected to the stem; the user interface module also being for detecting displacement at the first handle of a cursor responsive to the pointing device; the user interface module also being for updating the first three-dimensional position of the projection surface in a manner corresponding to the amount and direction of the displacement of the cursor; the user interface module also being for displaying on the display screen a second two-dimensional projection of the representation of the projection surface, the second two-dimensional projection being derived from the updated first three-dimensional position of the projection surface; and the user interface module further being for redisplaying the first handle attached to the second two-dimensional projection.

31. A video composing system, comprising:

a display screen, a pointing device, and a user interface module operatively connected to the display screen and to the user input device, the user interface module being for displaying on the display screen a first two-dimensional projection of a representation of a projection surface, the two-dimensional projection being derived from a first three-dimensional position of the projection surface; the user interface module also being for displaying a first handle attached to the first two-dimensional projection; the user interface module also being for detecting displacement at the first handle of a cursor responsive to the pointing device; the user interface module also being for updating the first three-dimensional position of the projection surface in a manner corresponding to the amount and direction of the displacement of the cursor; the user interface module also being for displaying on the display screen a second two-dimensional projection of the representation of the projection surface, the second two-dimensional projection being derived from the updated first three-dimensional position of the projection surface; the user interface module also being for redisplaying the first handle attached to the second two-dimensional projection; and the user interface module further being for changing the appearance of the cursor as it approaches the first handle.

32. A video editing method, comprising:

displaying on a display screen a first two-dimensional projection of a representation of a projection surface, the two-dimensional projection being derived from a first three-dimensional position of the projection surface, displaying a first handle attached to the first two-dimensional projection, detecting displacement at the first handle of a cursor responsive to a pointing device, updating the first three-dimensional position of the projection surface in a manner corresponding to the amount and direction of the displacement of the cursor, displaying on a display screen a second two-dimensional projection of the representation of the projection surface, the second two-dimensional projection being derived from the updated first three-dimensional position of the projection surface, redisplaying the first handle attached to the second two-dimensional projection, and displaying a graphical representation of a surface-based rotation axis based on the projection surface on the display screen when the surface-based axis ceases to coextend with a corresponding global axis.

33. The video editing method of claim 32, wherein the step of displaying a first handle displays a rotation handle, and wherein the step of updating the position updates the first three-dimensional position of the representation to correspond to a rotation of the representation around a first predefined axis.

34. The video editing method of claim 33, further including the step of responding to a mode change command to cause the step of displaying a first handle to display a different rotation handle, and wherein the step of updating the position updates the three-dimensional position of the representation to correspond to a rotation of the representation around a second predefined axis orthogonal to the first predefined axis.

35. The video editing method of claim 32, further including the step of displaying a rectangular frame associated with the representation, wherein the step of displaying a handle displays a handle on one side of the rectangular frame, and further including the step of displaying a second handle on another side of the rectangular frame opposite the one side of the rectangular frame.

36. The video editing method of claim 32 further including the step of storing effect parameters that define the second three-dimensional position.

37. The video editing method of claim 32, wherein the step of displaying a first projection displays a plurality of first projections, wherein the step of displaying a handle displays a plurality of handles, each connected to one of the plurality of first projections, wherein the step of detecting displacement detects displacement of one of the plurality of handles, wherein the step of updating the three-dimensional position updates the position of the one of the plurality of first projections, wherein the step of displaying a second projection displays a projection of a representation of the one of the plurality of first projections, and wherein the step of redisplaying redisplays the one of the plurality of handles.

38. The method of claim 37 further including the step of displaying a continuous path between the plurality of projections.

39. The video editing method of claim 38, wherein the step of displaying a continuous path displays a spline.

40. The video editing method of claim 38, wherein the step of updating only allows translation operations.

41. The video editing method of claim 38, wherein the step of updating the three-dimensional position updates the position of more than one of the plurality of first projections.

42. The video editing method of claim 32 wherein the handle is one of a crop handle, a rotation handle, a translation handle, and a scaling handle, and further including the step of selecting a mode that determines which type the handle is.

43. The method of claim 32 wherein the axis is displayed by displaying a rectangular frame icon that is not coplanar with the projection surface.

44. The method of claim 32 wherein the axis is displayed by displaying a dotted centerline located in the plane of the projection surface.

45. The method of claim 32 wherein the axis is displayed only when the surface-based axis ceases to coextend with a corresponding global axis.

46. The video editing method of claim 32, wherein the steps of displaying on a display screen display a two-dimensional projection of a two-dimensional representation of the projection surface.

47. The video editing method of claim 32 further including the step of displaying an effect made up of a series of two-dimensional projections of different projection surfaces each having different three-dimensional positions, the different three-dimensional positions having been defined by successive ones of the steps of detecting and updating, the different projection surfaces each having different frames of a video sequence projected thereon.

48. A video composing system, comprising:

a display screen, a pointing device, and a user interface module operatively connected to the display screen and to the user input device, the user interface module being for displaying on the display screen a first two-dimensional projection of a representation of a projection surface, the two-dimensional projection being derived from a first three-dimensional position of the projection surface; the user interface module also being for displaying a first handle attached to the first two-dimensional projection; the user interface module also being for detecting displacement at the first handle of a cursor responsive to the pointing device; the user interface module also being for updating the first three-dimensional position of the projection surface in a manner corresponding to the amount and direction of the displacement of the cursor; the user interface module also being for displaying on the display screen a second two-dimensional projection of the representation of the projection surface, the second two-dimensional projection being derived from the updated first three-dimensional position of the projection surface; the user interface module also being for redisplaying the first handle attached to the second two-dimensional projection; and the user interface module further being for displaying a graphical representation of a surface-based rotation axis based on the projection surface on the display screen when the surface-based axis ceases to coextend with a corresponding global axis.

49. The video composing system of claim 48 further including storage operatively connected to the user interface module for storing effect parameters that define the second three-dimensional position.

50. The video composing system of claim 48 further including a display module operatively connected to the storage; wherein the display module is for retrieving a series of video frames from the storage; wherein the display module is also for displaying an effect comprising a series of further two-dimensional projections of the projection surface in different three-dimensional positions; each further two-dimensional projection of the surface having a different one of the video frames projected thereon; and wherein the user interface module is further for obtaining and storing the different three-dimensional positions.

\* \* \* \* \*